United States Patent [19]

Navarro

[11] 4,339,922
[45] Jul. 20, 1982

[54] DUAL TURBINE TURBO-SUPERCHARGER

[76] Inventor: Bernard J. Navarro, 3252 E. Chevy Chase, Glendale, Calif. 91206

[21] Appl. No.: 55,653

[22] Filed: Jul. 9, 1979

[51] Int. Cl.³ .......................................... F02B 37/12
[52] U.S. Cl. .................................. 60/602; 60/605; 417/406; 415/148
[58] Field of Search ............... 415/143, 153 R, 153 A, 415/154, 148; 60/602, 603, 600, 601, 605, 612; 417/407, 406

[56] References Cited

U.S. PATENT DOCUMENTS

| | | | |
|---|---|---|---|
| 887,892 | 5/1908 | Tekippe | 415/153 |
| 2,444,644 | 7/1948 | Fullemann | 60/602 |
| 2,750,893 | 6/1956 | Thomas et al. | 415/153 A X |
| 2,904,307 | 9/1959 | Balje | 415/95 |
| 3,557,549 | 1/1971 | Webster | 60/602 |
| 3,559,397 | 2/1971 | Navarro | 60/602 |
| 4,171,936 | 10/1979 | Hageman et al. | 417/407 |

FOREIGN PATENT DOCUMENTS

| | | | |
|---|---|---|---|
| 1004861 | 3/1957 | Fed. Rep. of Germany | 60/605 |
| 2212960 | 9/1973 | Fed. Rep. of Germany | 60/606 |
| 1130322 | 9/1956 | France | 60/605 |

OTHER PUBLICATIONS

"The Internal-Combustion Engine in Theory & Practice", vol. I, pp. 464–467, vol. II, pp. 562–563, *MIT Press*, 1966–1968, by Charles Taylor.

*Primary Examiner*—Michael Koczo, Jr.
*Attorney, Agent, or Firm*—Warren Jessup

[57] ABSTRACT

A dual turbine turbocharger for an engine comprising a first turbine wheel and a second turbine wheel mounted on a common shaft in a dual scroll turbine housing for receiving exhaust gases. The twin turbines are isolated from each other by a partition separating the dual scrolls of the turbine housing. The scrolls begin as separate inlet ports for connection to isolated exhaust gas discharge systems.

1 Claim, 5 Drawing Figures

DUAL TURBINE TURBO-SUPERCHARGER

BACKGROUND OF THE INVENTION

This invention relates to turbocharger systems and more particularly relates to multiple turbocharger systems.

Internal combustion engines are frequently equipped with turbo-superchargers to provide a boost in horsepower. However, the boost and usefulness of the turbocharger is usually limited to a very narrow range of engine speeds. The turbine section of the turbo-supercharger essentially depends upon exhaust gas volume and exhaust gas pressure to drive the centrifugal compressor portion, more commonly referred to as the supercharger.

Conventional turbochargers have a very limited operational efficiency range that limits their maximum effectiveness to approximately 25% of the range of an engine's RPM capability. This means that it is possible to select a turbine size that will function well within a narrow band of an engine's total RPM range. Thus, a small turbine will function well at low engine speeds (RPM); whereas, a large one will not function at all at these speeds. Conversely, a large turbine will function well at high engine speeds (RPM), while a small turbine, though able to function with a low volume of exhaust gases provided by an engine at low speeds, will produce excessive back pressure at high engine RPM. In fact a small turbine can actually be detrimental to engine performance at higher RPM, so much so that the engine at times can perform better in that range without the turbocharger. The large turbine, though it would not produce high back pressure at high engine speed, is conditionally inefficient because it simply will operate very little or not at all with the low volume of exhaust gas available at low engine speeds.

As the air flow requirements of a turbo supercharged engine increase, more turbine power must be provided in order to rotate the centrifugal compressor to meet the increased flow requirements. One traditional method of accomplishing this is to allow the exhaust gas pressure that is entering the turbine to increase proportionately. Consequently, numerous turbocharger arrangements have been devised to alleviate the problems. Examples of devices used to alleviate this problem are systems with two completely separate turbochargers or the use of a dual scroll with a single turbine wheel.

However, these devices necessarily result in complex configurations requiring sophisticated control systems and have not been particularly effective in specialized vehicle applications. The disadvantage of the present dual scroll turbines used in conjunction with dual exhaust systems to increase efficiency is that although they have separate inlets, they direct the exhaust gas flow through a common annular space to react against a single turbine wheel. This allows normally isolated engine exhaust gas streams to partially react against each other, thereby decreasing engine breathing efficiency. This defeats the purpose of isolated exhaust manifolds to prevent interference at overlap events. (An overlap event occurs when both intake and exhaust valves are opened simultaneously in the same cylinder.) Exhaust gas that initially leaves the cylinder when an exhaust valve opens is at high pressure and flows at high velocity. The flow that exists when an exhaust valve is closing and intake is opening referred to as an overlap event is at low pressure and low velocity. With some of the prior art systems, high-pressure events are not isolated from low-pressure events, allowing exhaust gas reversion.

SUMMARY OF THE INVENTION

The purpose of the present invention is to provide the advantages of a small-size turbine and a large-size turbine in a single turbocharger.

In order to broaden the operational range of a turbocharger, two turbines are employed to drive a single centrifugal compressor in the present invention. Each turbine, mounted on a common shaft, possesses a totally isolated housing. The twin turbocharger of the present invention can be particularly advantageous when used with the diverter valve disclosed and described in U.S. Pat. No. 3,559,397, issued Feb. 2, 1971, to the inventor of the present invention. One turbine receives the total exhaust gas output from the engine and the flow to the second turbine is prevented by the diverter valve of the above patent. The diverter valve is kept in the single turbine mode until the exhaust gas pressure to operate the turbine becomes excessive. Then it is shifted to a dual turbine operation, thereby extending the engine's range of efficient turbocharger operation. With the twin turbine concept of the present invention, turbine wheel area is doubled in order to increase turbine power without increasing the back pressure.

Simply stated, when double the turbine area is provided to drive the centrifugal compressor, double the power is available. An additional advantage of the twin turbine concept of the present invention is that it allows total isolation of the twin exhaust gas systems for an engine. When the turbocharger is operating in a twin turbine mode, half the engine cylinders are connected to the inlet port feeding one turbine, while the other half of the cylinders are connected to the inlet port feeding the second turbine.

The separation of the exhaust systems is according to firing order as is the customary practice in high-efficiency, normally aspirated engines. This arrangement in some ways is actually more important to a turbocharged engine than to a normally aspirated engine. The significance of trying to minimize the back pressure is to prevent re-entry of exhaust gas into cylinders that are at the overlap event described above, where both an intake and exhaust valve are opened simultaneously in the same cylinder.

In the twin turbine turbocharger of the present invention a dual scroll with separate inlets is provided for isolating the dual turbines from each other. The dual turbines include dual turbine wheels mounted on a common shaft in each scroll of the turbocharger housing with a partition isolating the turbine wheels. Thus, back-to-back dual turbines are mounted in a housing attached to a common shaft for operating the usual centrifugal compressor with the diverter valve of the patent identified hereinabove. A single turbine is operated at low RPM providing efficient operation with moderate back pressure, while at higher RPM, the diverter valve delivers the exhaust gases separately to each turbine to increase the turbine power without increasing the back pressure. Thus, with both turbine wheels being driven by isolated exhaust gas systems, double the turbine area is provided to drive the centrifugal compressor and double the power is available.

It is one object of the present invention to provide a dual turbine turbocharger for driving a common centrifugal compressor.

Still another object of the present invention is to provide a dual turbine turbocharger having twin turbine wheels driving a common shaft.

Yet another object of the present invention is to provide a dual turbine turbocharger having a dual scroll housing for driving turbine wheels with the dual scroll housings being isolated from each other.

Other objects, advantages and novel features of the invention will become apparent from the following detailed description of the invention, in conjunction with the drawings, wherein like parts are identified by like numbers throughout.

DETAILED DESCRIPTION OF THE PREFERRED EMBODIMENT

Figure 1:
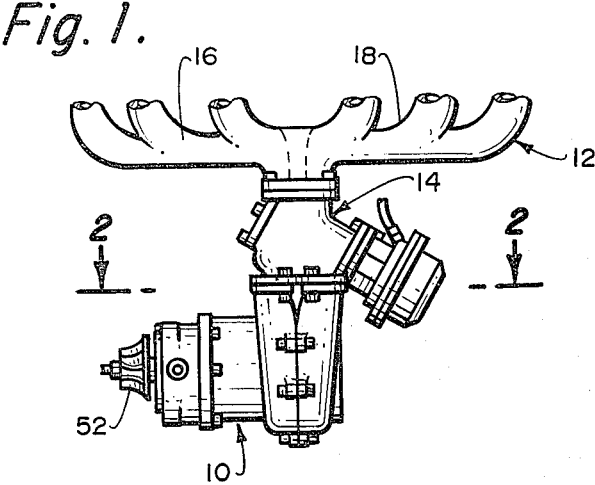
FIG. 1 is a fragmentary view of an internal combustion engine exhaust system connected by a diverter valve to the twin turbine turbocharger of the invention.

The twin turbine turbocharger is shown in FIG. 1 at 10 connected to the exhaust manifold 12 of the usual internal combustion engine by means of a diverter valve 14. Preferably the diverter valve 14 is the supercharger control mechanism described and disclosed in U.S. Pat. No. 3,559,397, issued Feb. 2, 1971 to the same inventor of the invention disclosed herein. The exhaust system 12 is a split-exhaust system comprised of manifolds 16 and 18 to keep high-pressure events isolated from low-pressure events reducing the possibility of exhaust gas reversion.

Figure 2:
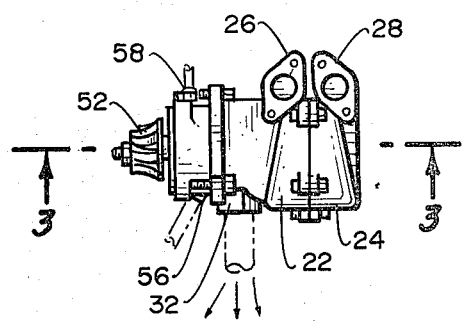
FIG. 2 is a view of the twin turbine turbocharger of the present invention taken at 2—2 of FIG. 1.
Figure 3:
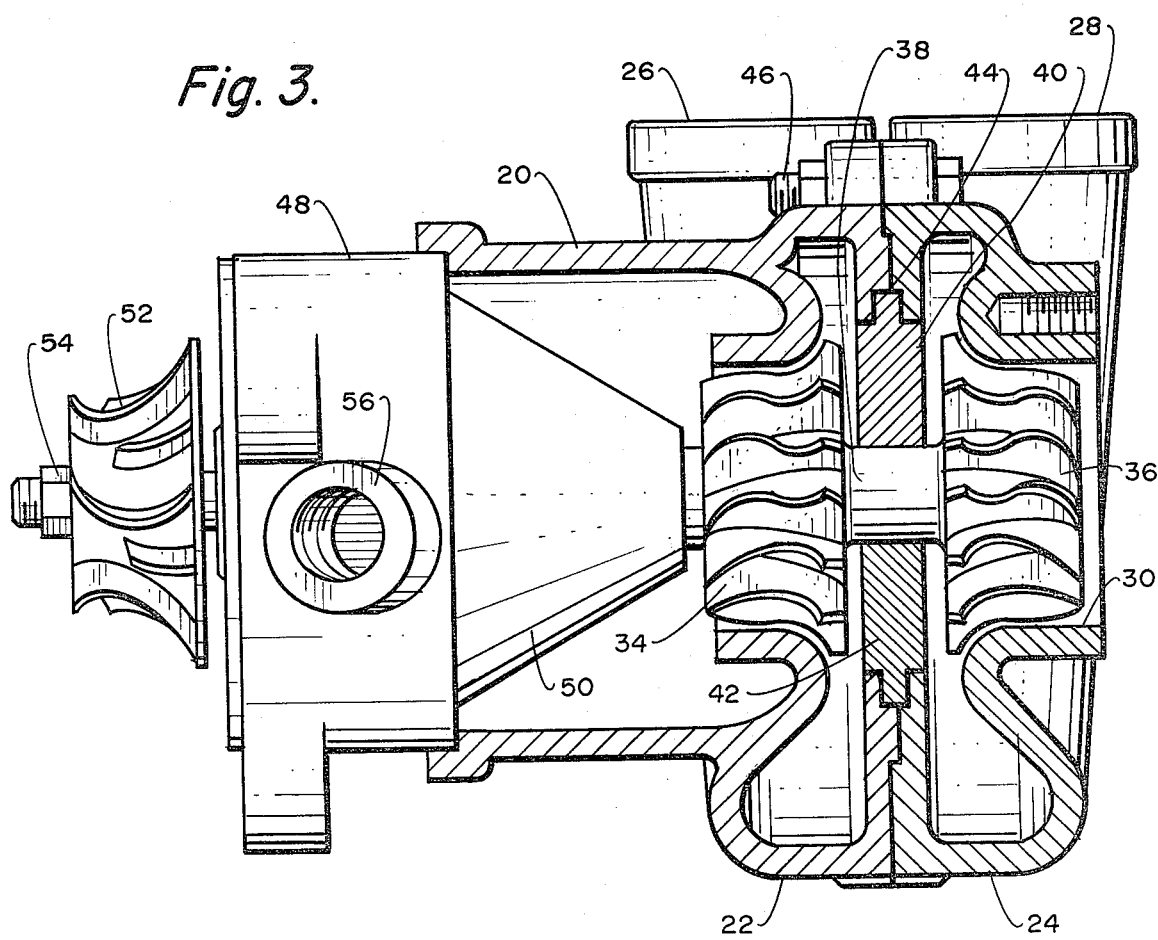
FIG. 3 is a sectional view of the twin turbine turbocharger of the present invention taken at 3—3 of FIG. 2.

The twin turbine turbocharger of the present invention is illustrated in FIGS. 2 and 3. The turbocharger is comprised of a housing 20 having dual scrolls 22 and 24 with exhaust inlet ports 26 and 28. Exhaust from scroll 24 exits from port 30 while exhaust from scroll 22 exits from port 32 (FIG. 2). Dual turbine wheels 34 and 36 are mounted on a common turbine shaft 38. The twin turbines are isolated from each other by means of a split partition comprised of semi-circular plates 40 and 42 fitting around shaft 38 and held in place by annular groove 44 of scroll housings 22 and 24. The partition plates 40 and 42 are held in place by means of bolts 46 attaching scroll housing 24 to scroll housing 22.

A centrifugal compressor wheel 52 is attached to the forward end of turbine shaft 38 passing through bearing housing 48 which includes a conical heat shield or deflector 50 protecting bearings for shaft 38. Compressor wheel 52 is connected to the forward end of the turbocharger shaft 38 by means of nut 54. Lubricating ports 56 and 58 on bearing housing 48 provide lubrication by circulating oil through the bearings of the turbocharger. Such lubrication systems are conventional in the art and details of such are not necessary to this invention.

Figure 4:
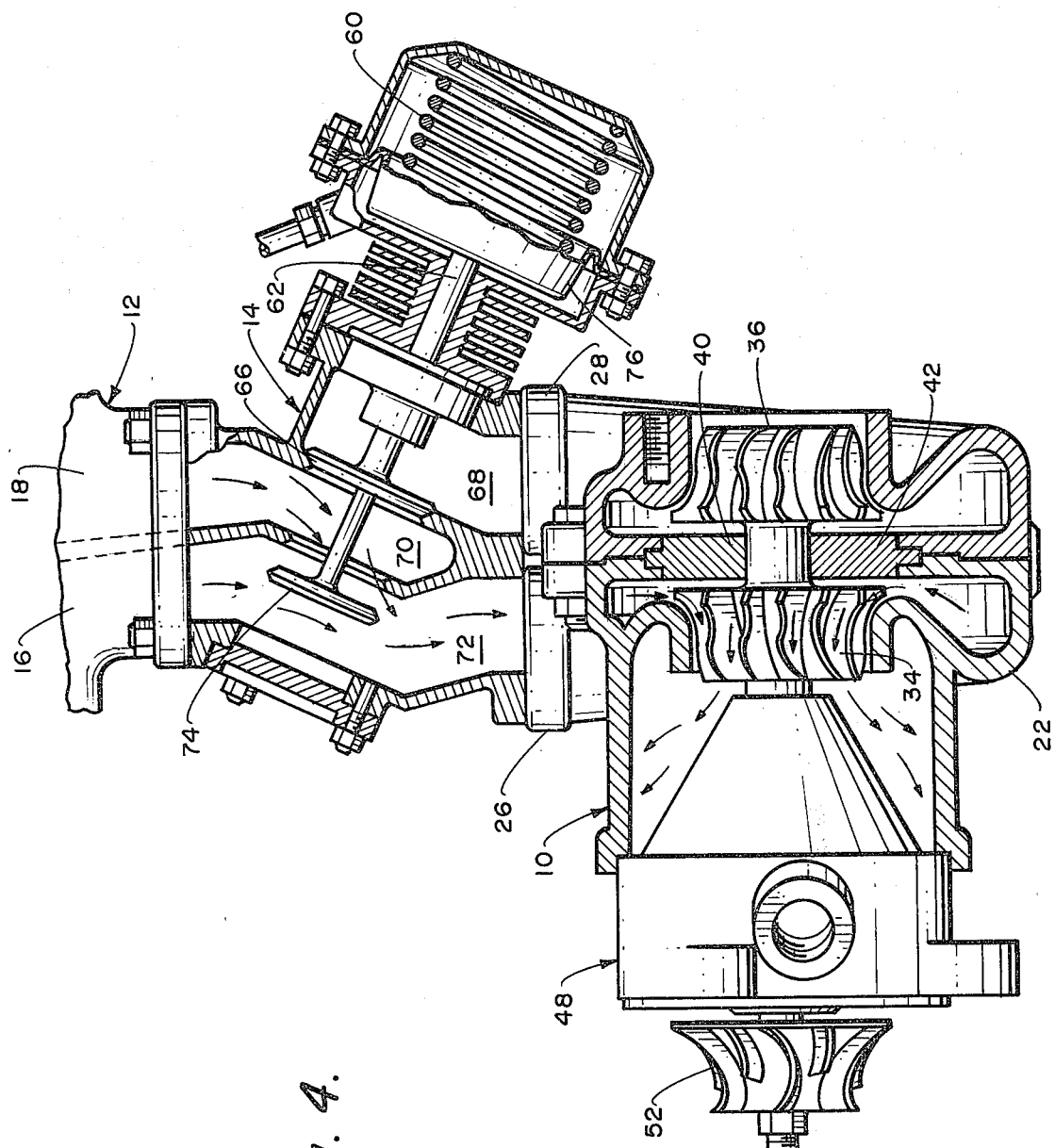
FIG. 4 is a sectional view illustrating the operation of the twin turbine turbocharger in the single turbine mode.
Figure 5:
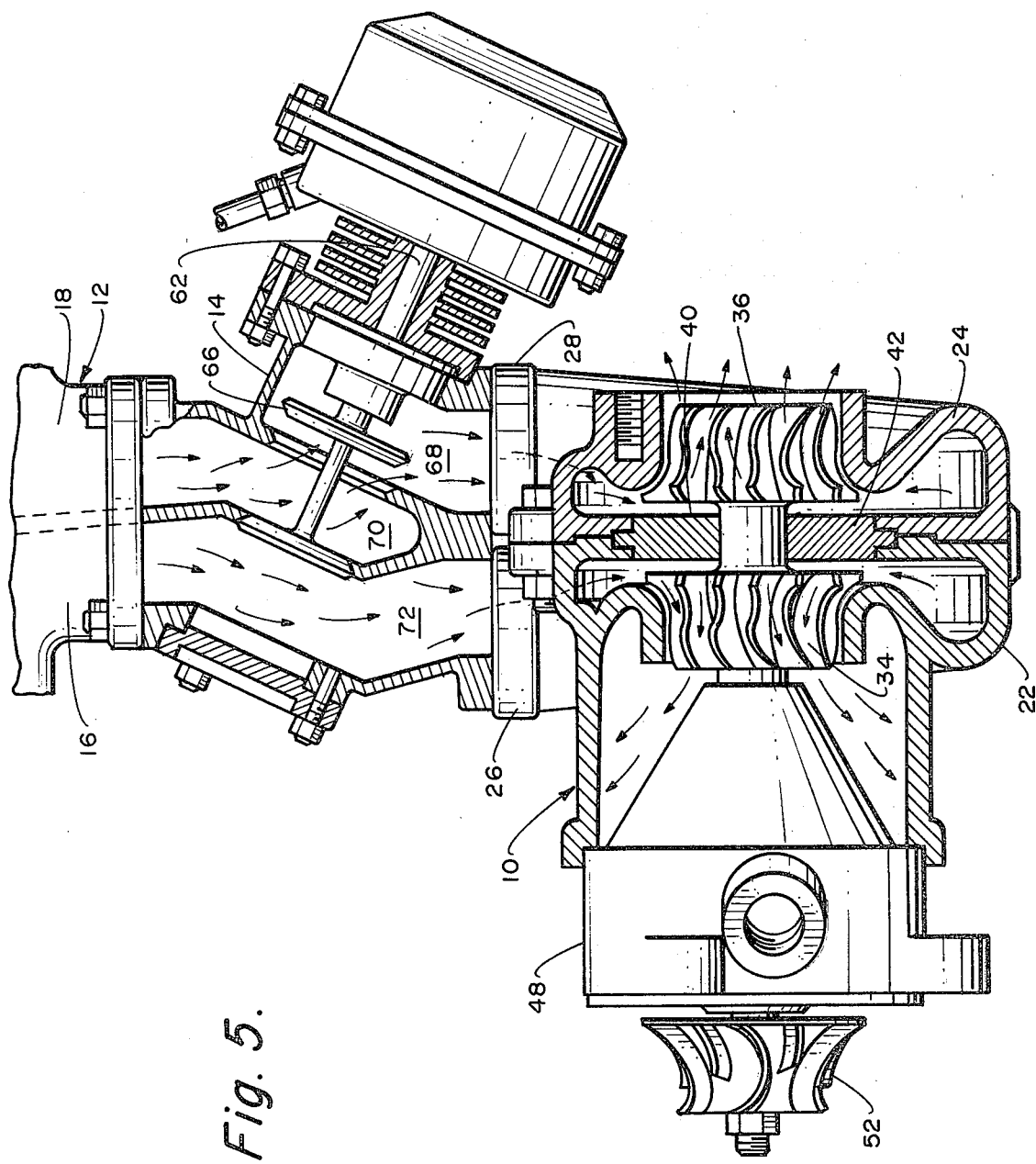
FIG. 5 is a sectional view illustrating the operation of the twin turbine turbocharger in the dual turbine mode.

The operation of the twin turbine of the present invention is illustrated in FIGS. 4 and 5. It should be noted that in both these figures the twin turbine turbocharger of the present invention is connected to the internal combustion engine exhaust system through a diverter control mechanism disclosed in the patent referred to above, but may be connected directly to the engine exhaust. While use of the diverter control mechanism shown is preferred, the system will operate more efficiently than prior dual scrolls without the diverter valve because the totally isolated dual turbine turbocharger still will have an advantage over the conventional dual housing single-turbine type, or the multiple turbine system.

For low RPM operation, the dual turbine turbocharger will operate as illustrated in FIG. 4. The twin turbine turbocharger will be connected to the engine exhaust system 12 by means of diverter control valve 14. When the manifold pressure is below a predetermined minimum pressure, the spring 60 of the diverter valve 14 biases the spindle 62 to the left in FIG. 4 so that valve member 66 seats, closing off the passageway 68 from passageway 70. At this time the valve member 74 is displaced from its seat, connecting passageway 70 to passageway 72. Passageway 72 is connected to exhaust manifold 16 while passageway 70 is connected to exhaust manifold 18. With the diverter valve 14 in the position shown in FIG. 4, all of the exhaust gases are diverted to scroll 22 against turbine wheel 34 for driving the centrifugal compressor wheel 52.

When the exhaust manifold pressure rises above the predetermined minimum pressure, the diaphragm 76 is caused to move against the spring pressure 60 to move the spindle 62 to the position shown in FIG. 5. In this position the valve 74 is seated while the valve member 66 is open, connecting passageway 68 to passageway 70, while closing off passageway 70 from passageway 72. In this mode, exhaust gases from manifold 16 are directed into scroll 22 of turbine 10 driving turbine wheel 34, while exhaust gases from manifold 18 pass through passageways 70 and 68 into scroll 24, driving turbine wheel 36. Thus, the twin turbines are being separately driven to operate centrifugal compressor wheel 52. The turbine area is thus doubled, increasing turbine power without increasing turbine back pressure. With double the turbine area provided to drive the centrifugal compressor wheel, double the power is available. With the dual-turbine concept of the present invention, distinct advantages over dual-turbine types with or without the diverter valve are provided.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. Turbocharger apparatus for use with a piston/cylinder internal combustion engine having an intake manifold and two totally discrete exhaust manifolds connected to and fed by respective two discrete groups of pistons/cylinders, comprising:
   a turbocharger having a first turbine, a second turbine and a compressor wheel connected by a common drive-train;
   first conduit means for connecting one of the exhaust manifolds to said first turbine;
   second conduit means for connecting the other of the exhaust manifolds to said second turbine;

valving means communicating with said first and second conduit means for directing exhaust gas flow selectively from both of said conduit means to said first turbine or alternatively directing flow from said first conduit means to said first turbine and directing flow from said second conduit means to said second turbine; and third conduit means for connecting the output of said compressor wheel to the intake manifold of the engine.

* * * * *